(12) United States Patent
Chambers

(10) Patent No.: US 7,310,518 B2
(45) Date of Patent: Dec. 18, 2007

(54) SERVING ROAMING MOBILES WITH INCORRECTLY PROGRAMMED IDENTIFIERS

(75) Inventor: Michael Dwayne Chambers, Plainfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 405 days.

(21) Appl. No.: 10/448,575

(22) Filed: May 30, 2003

(65) Prior Publication Data

US 2004/0242215 A1 Dec. 2, 2004

(51) Int. Cl.
*H04Q 7/20* (2006.01)

(52) U.S. Cl. .................... 455/418; 455/419; 455/420; 455/432.2; 455/432.3; 455/433; 455/435.1; 455/432.1

(58) Field of Classification Search ........ 455/418–420, 455/432.1–432.3, 433, 435.1–435.3, 461
See application file for complete search history.

(56) References Cited

U.S. PATENT DOCUMENTS

| | | | |
|---|---|---|---|
| 5,854,982 A * | 12/1998 | Chambers et al. | 455/445 |
| 6,684,073 B1 * | 1/2004 | Joss et al. | 455/433 |
| 6,714,799 B1 * | 3/2004 | Park et al. | 455/558 |
| 6,882,839 B2 * | 4/2005 | Jacobson et al. | 380/218 |
| 2004/0005892 A1 * | 1/2004 | Mayer et al. | 455/432.1 |

* cited by examiner

Primary Examiner—Charles N. Appiah
Assistant Examiner—Bryan Fox

(57) ABSTRACT

A method is provided for supplying service to mobile stations (MS) (20) utilizing a wireless telecommunications network (A). Each of the MS has a home country and a home network and is programmed with an identifier comprising a number including a set of digits. Each identifier is one of two types including a first type of identifier that uniquely identifies its MS globally via the entire set of digits making up the identifier (e.g., a true International Mobile Station Identity (IMSI)) and a second type of identifier that uniquely identifies its MS within its home country via a subset of least significant digits making up the identifier (e.g., a Mobile Identification Number (MIN)-based IMSI). The method includes: obtaining the identifiers from MS entering the wireless telecommunications network during a study period; collecting a subset of most significant digits from each identifier obtained during the study period; compiling a list of digit patterns, each digit pattern in the list corresponding to one of the subsets of most significant digits collected; receiving identifiers from MS accessing the wireless telecommunications network; and, comparing the subsets of most significant digits of the received identifiers to the compiled list to determine which of the received identifiers are the first type and which are the second type of identifier.

19 Claims, 3 Drawing Sheets

SERVING ROAMING MOBILES WITH INCORRECTLY PROGRAMMED IDENTIFIERS

FIELD

The present invention relates to the telecommunication arts. It finds particular application in conjunction with wireless networks, and will be described with particular reference thereto. However, it is to be appreciated that the present invention is also amenable to other like applications.

BACKGROUND

As is known, wireless networks use numeric identifiers to communicate with Mobile Stations (MS) over an air interface. Messages or communications exchanged between the wireless network and MS contain identifiers in the form of numeric digits that permit the network to distinguish between different MS while performing operations related to calls (e.g., call setup) and roaming (e.g., mobile registration). Historically, wireless networks based on Advanced Mobile Phone System (AMPS) standards have used a 10 digit Mobile Identification Number (MIN) as the identifier for MS.

However, as specified by the International Telecommunications Union-Telecommunication Standardization Sector (ITU-T), Code Division Multiple Access (CDMA) based wireless networks are to support an International Mobile Station Identity (IMSI) as the identifier for MS so that service can be provided to international roamers. With reference to FIG. 1, the IMSI is a unique identifier up to 15 digits in length allocated to each mobile subscriber in CDMA networks. It consists of a Mobile Country Code (MCC), a Mobile Network Code (MNC) and a Mobile Station Identification Number (MSIN). In a properly programmed true IMSI, the MCC is a three digit number uniquely identifying a given country, the MNC is either a two or three digit number used to uniquely identify a given network from within a specified country, and the MSIN is a 10 digit number uniquely identifying a MS or subscription from within a given network. Unlike MINs, which with some exceptions are administered on a per-country basis, IMSIs are administered globally so as to allow them to be used to uniquely identify MS that roam between different countries, i.e., international roamers.

Unfortunately, many CDMA MS have been programmed with IMSIs that contain incorrect digit patterns for the five most significant digits. Traditionally, this has not been a problem because wireless CDMA networks have in the past used only the 10 least significant digits of the IMSI as a MIN for identifying MS. However, this incorrect programming of IMSIs becomes a problem when wireless CDMA networks start using the full IMSI as a mobile identifier.

In some cases, a wireless service provider (WSP) does not even know what values for the upper or most significant IMSI digits have been programmed into their CDMA MS. Again, because of the historic use of only the 10 least significant digits of the IMSI as a MIN, the upper digits were not relevant and accordingly were ignored completely or programmed with random or otherwise meaningless values. The following are some examples of the problems that can be caused by incorrect mobile programming of IMSIs:

1. Certain specified values of the five most significant IMSI digits are typically used to differentiate MIN-based IMSIs (i.e., IMSIs that are programmed to have their least significant digits used as MINs) from true IMSIs (i.e., IMSIs that are programmed to be used as IMSIs). These values for the most significant digits are specified in the standards and are referred to and known as MIN escape codes. However, it is difficult to administer the MIN escape codes used by wireless networks to recognize a MIN-based IMSI when the five most significant IMSI digits are incorrectly programmed. Accordingly, this results in reduced or no service for the MS user.

2. The IMSI and especially the most significant digits of the IMSI are used as Global Titles (GTs), as are known in the art, for routing American National Standards Institute (ANSI)-41 messages and the like between different elements in wireless networks to support inter-network operations. It is difficult to administer the IMSI GTs used by the signalling networks (e.g., Signalling System No. 7 (SS7) network) to correctly route ANSI-41 messages for MS having incorrectly programmed IMSIs. This is a particular problem for international roamers because the three most significant digits of the IMSI represent the Mobile Country Code (MCC). Without the correct MCC, it is difficult for the signalling network to route ANSI-41 messages for international roamers to the country where their home network is located.

Some solutions to incorrect programming of IMSIs include: reprogramming the MS containing the incorrectly programmed IMSIs; continuing to use MINs instead of IMSIs as mobile identifiers; and, using what is known as a Point Code (PC) instead of a GT to route ANSI-41 messages between wireless networks that are located in different countries.

However, reprogramming the MS containing the incorrect IMSIs is likely to be cost prohibitive. Since service providers may not know which MS are incorrectly programmed, they would have to inspect the IMSIs of all their deployed MS. One way of performing this inspection is to ask each mobile user to bring his/her MS to a service center, a potentially inconvenient and expensive proposition. Another way is to read and reprogram each MS's IMSI over the air. Unfortunately, some MS do not support such an over the air data administration capability, and WSPs may not have deployed this capability in their networks.

Continuing to use MINs instead of IMSIs as mobile identifiers is inconsistent with the wireless industry's long term plans to evolve to exclusively using IMSIs as mobile identifiers. Further, since most MINs are not administered globally, instances may arise were MS identifiers are not unique within the same wireless network or system, i.e., two MS within the same network may in effect have the same MIN, e.g., one MS may be within its home network while another is an international roamer. Accordingly, providing service to these MS in such circumstances is a problem in so much as they cannot be distinguished from one another based upon their MINs. Further, the MIN is not an ITU-T recognized numbering plan, so signaling network providers and WSPs would be forced to reach agreements outside of the standard on how to globally administer signaling points for MIN-based GT translations.

Finally, using PCs instead of GTs to route ANSI-41 messages between wireless networks that are located in different countries, fails to take advantage of existing SS7 (also known as C7) networks. The PC solution involves dedicated signaling data links and systems that can be costly to deploy, administer and maintain. Additionally, PCs assigned for use in a given country will have to be assigned to systems in other countries, which may result in exhausting available PCs for that given country.

Accordingly, the present invention contemplates a new and improved method and/or system that overcomes the above-referenced problems and others.

SUMMARY

In accordance with an aspect of the present invention, a method is provided for supplying service to MS utilizing a wireless telecommunications network. Each of the MS has a home country and a home network and is programmed with an identifier comprising a number including a set of digits. Each identifier is one of two types including a first type of identifier that uniquely identifies its MS globally via the entire set of digits making up the identifier (e.g., an IMSI) and a second type of identifier that uniquely identifies its MS within its home country via a subset of the least significant digits making up the identifier (e.g., MIN-based IMSI). The method includes: obtaining the identifiers from MS entering the wireless telecommunications network during a study period; collecting a subset of the most significant digits from each identifier obtained during the study period; compiling a list of digit patterns, each digit pattern in the list corresponding to one of the subsets of the most significant digits collected; receiving identifiers from MS accessing the wireless telecommunications network; and, comparing the subsets of the most significant digits of the received identifiers to the compiled list to determine which of the received identifiers are the first type and which are the second type of identifier.

In accordance with another aspect of the present invention, a system is provided for supplying service to MS utilizing a wireless telecommunications network. Each of the MS has a home country and a home network and is programmed with an identifier comprising a number including a set of digits. Each identifier is one of two types including a first type of identifier that uniquely identifies its MS globally via the entire set of digits making up the identifier and a second type of identifier that uniquely identifies its MS within its home network via a subset of least significant digits making up the identifier. The system includes: means for obtaining the identifiers from mobile stations entering the wireless telecommunications network during a study period; means for collecting a subset of most significant digits from each identifier obtained during the study period; means for compiling a list of digit patterns, each digit pattern in the list corresponding to one of the subsets of most significant digits collected; means for receiving identifiers from mobile stations accessing the wireless telecommunications network; and, means for comparing the subset of most significant digits of the received identifiers to the compiled list to determine which of the received identifiers are the first type and which are the second type of identifier.

In accordance still another aspect of the present invention, a method is presented for providing service to roaming MS utilizing a visited wireless telecommunications network of a WSP. The network includes a Mobile Switching Center (MSC), and each of the MS have a home country and a home network. The MS are programmed with an International Mobile Station Identity (IMSI), the IMSI being a plurality of digits including digits for specifying a Mobile Country Code (MCC) identifying the home country of the MS and a Mobile Network Code (MNC) identifying the home network of the respective MS. The method include: the WSP for the visited network obtaining the MCC and MNC for each home country and home network of MS for which service is to be provided; entering the obtained MCC and MNC into a database of the MSC; the MSC receiving a request for service from a roaming MS, the request including the IMSI programmed in the roaming MS; generating a corrected IMSI by replacing in the IMSI received from the roaming MS requesting service those digits specified for the MCC and MNC with the MCC and MNC from the MSC database; and, using the corrected IMSI as a GT to route messages for wireless intersystem operations to the home country and home network of the roaming MS.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF PREFERRED EMBODIMENTS

For clarity and simplicity, the present specification shall refer to structural and/or functional network elements, entities and/or facilities, relevant telecommunications standards, protocols and/or services, and other components that are commonly known in the telecommunications art without further detailed explanation as to their configuration or operation except to the extent the same has been modified or altered in accordance with and/or to accommodate aspects of the present invention.

Figure 1:
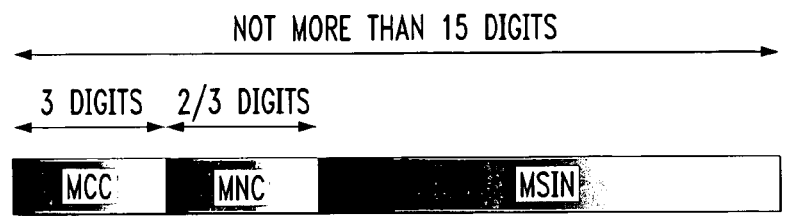
FIG. 1 is a diagram showing a properly programmed true IMSI.
Figure 2:
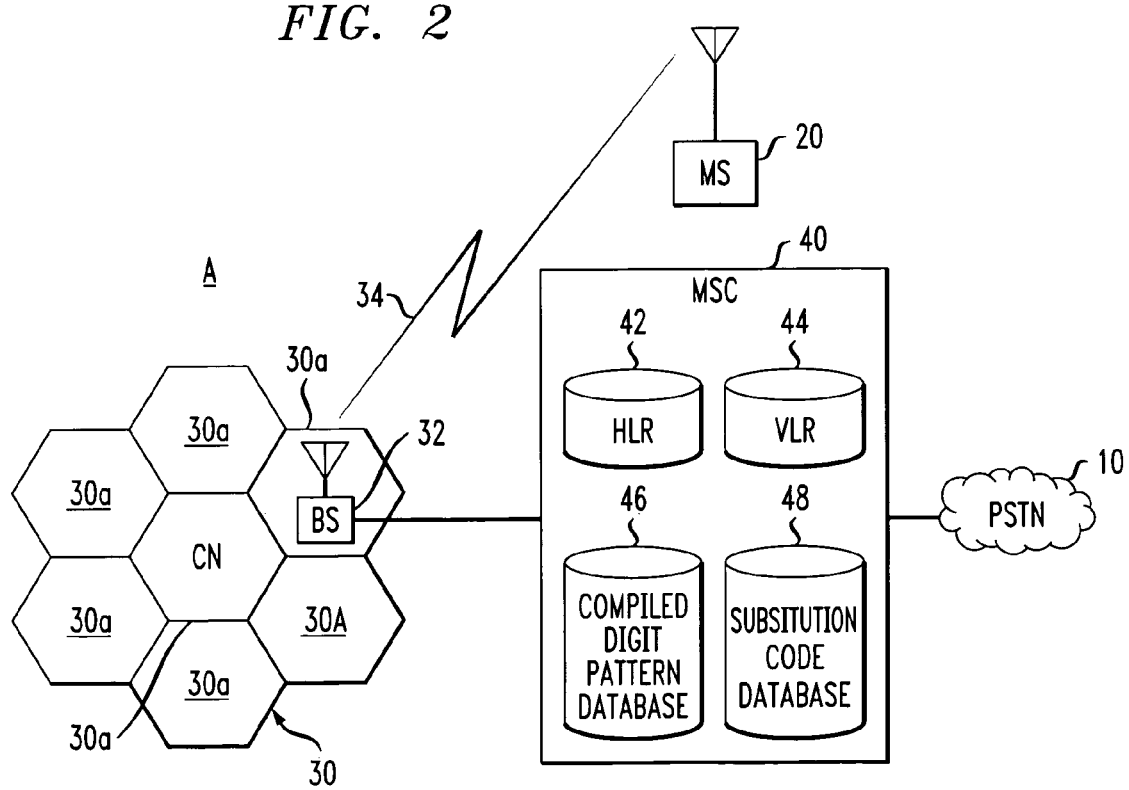
FIG. 2 is a block diagram showing an exemplary wireless telecommunications network suitable for practicing aspects of the present invention.

With reference to FIG. 2, a wireless network A is shown in communication with a Public Switched Telephone Network (PSTN) 10, suitably however, the PSTN 10 may be a Packet Data Network (PDN) or some combination of a PSTN and PDN or some other communications network including but not limited to a Postal, Telegraph, and Telephone (PTT) network or a network providing packet service, multimedia service, Voice over Internet Protocol (VoIP) service, etc. As shown, a MS 20 receives wireless service from a WSP over a Cellular Network (CN) 30 that includes a Base Station (BS) 32 with which the MS 20 operatively connects via a wireless air interface 34. A Mobile Switching Center (MSC) 40 interfaces the CN 30 with the PSTN 10 in the usual manner and includes what are known as a Home Location Register (HLR) 42 and a Visitor Location Register (VLR) 44 or other like location databases with which MS being served by the CN 30 are registered. Suitably, the wireless network A is a CDMA network equipped and/or arranged to process both MIN-based IMSIs and true IMSIs received from the MS 20 being served thereby. Notably, as will be understood by those skilled in the art upon further reading of the present specification, the MSC 40 is able to serve both home and roaming MS 20, even if they have incorrectly programmed IMSIs, and with respect to roamers, the MSC is able to serve both national and international roamers.

For clarity and simplicity, only a single MS and its supporting network elements are shown in FIG. 2. However, it is to be appreciated that suitably a plurality of such MS and/or supporting network elements are similarly equipped and/or situated within the wireless network in the usual manner so as to likewise take advantage of aspects of the present invention. Further, for exemplary purposes herein, only a single wireless network has been described. However, it is also to be appreciated that suitably a plurality of such wireless networks are similarly equipped and/or situated so as to likewise take advantage of aspects of the present invention.

Figure 3:
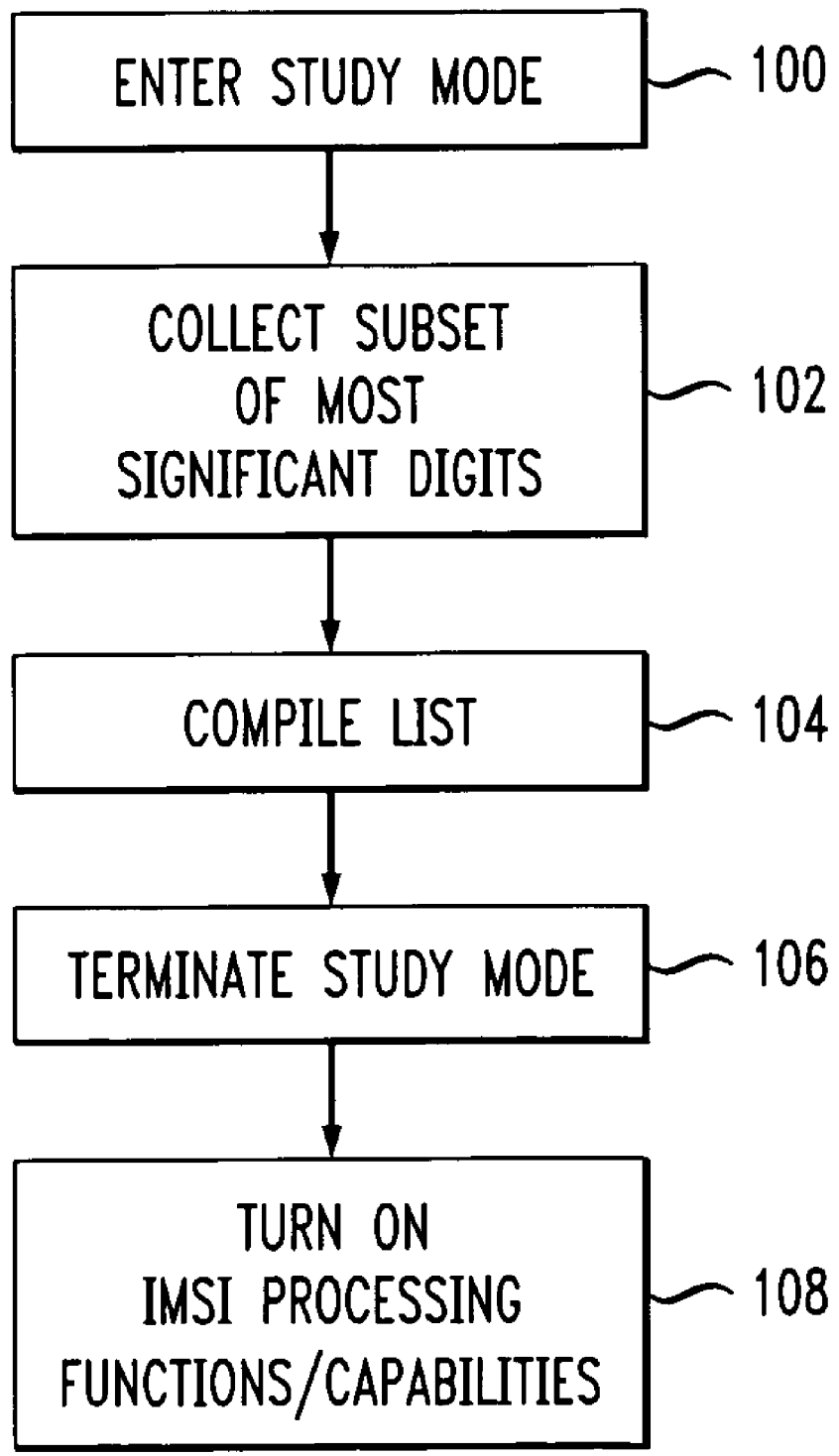
FIG. 3 is a flow chart showing an exemplary method for compiling a list of most significant digit patterns in a study mode implemented in accordance with aspects of the present invention.

Before wireless service is provided, it is determined what digit patterns exist in the upper digits of incorrectly programmed IMSIs for MS that wish to obtain service from the wireless network A. With reference to FIG. 3, in accordance with a suitable implementation of the present invention, at step 100, the wireless network A is first placed in a "study mode" for a determined, set or otherwise selected amount of time, i.e., a study period. During the study period, the wireless network A has its true IMSI processing functions and/or capabilities suitably turned off, off-line or otherwise deactivated, while still providing service to MS having MIN-based IMSIs. Every MS identifier received (e.g., as a result of registration with the MSC 40) is assumed to be a MIN-based IMSI. This is a safe assumption for networks that have historically been MIN-based networks because all or most of their existing MS are likely to have been programmed with MIN-based IMSIs. In fact, the MS 20 that previously received service from the wireless network A when it operated in MIN-based mode must have programmed with MIN-based IMSIs to that receive service. At step 102, the MSC 40 collects a number of the most significant digits, e.g., the 5 most significant digits, of every received IMSI during the study period. A list of collected digit patterns is compiled, saved and or maintained (e.g., in a database 46 located at the MSC 40) at step 104. The list therefore includes the specified MIN escape codes including those obtained from the incorrectly programmed digit patterns for the upper or most significant IMSI digits.

Suitably, the study period is long enough to ensure that all or substantially all MS that wish to use the wireless network A have entered the CN 30 and/or registered with the MSC 40 and/or otherwise have had their MIN-base IMSI obtained by the network. When the study period expires, the study mode is terminated or otherwise turned off at step 106, and at step 108, the true IMSI processing functions and/or capabilities of the wireless network A are turned on, brought on-line or otherwise activated.

Figure 4:
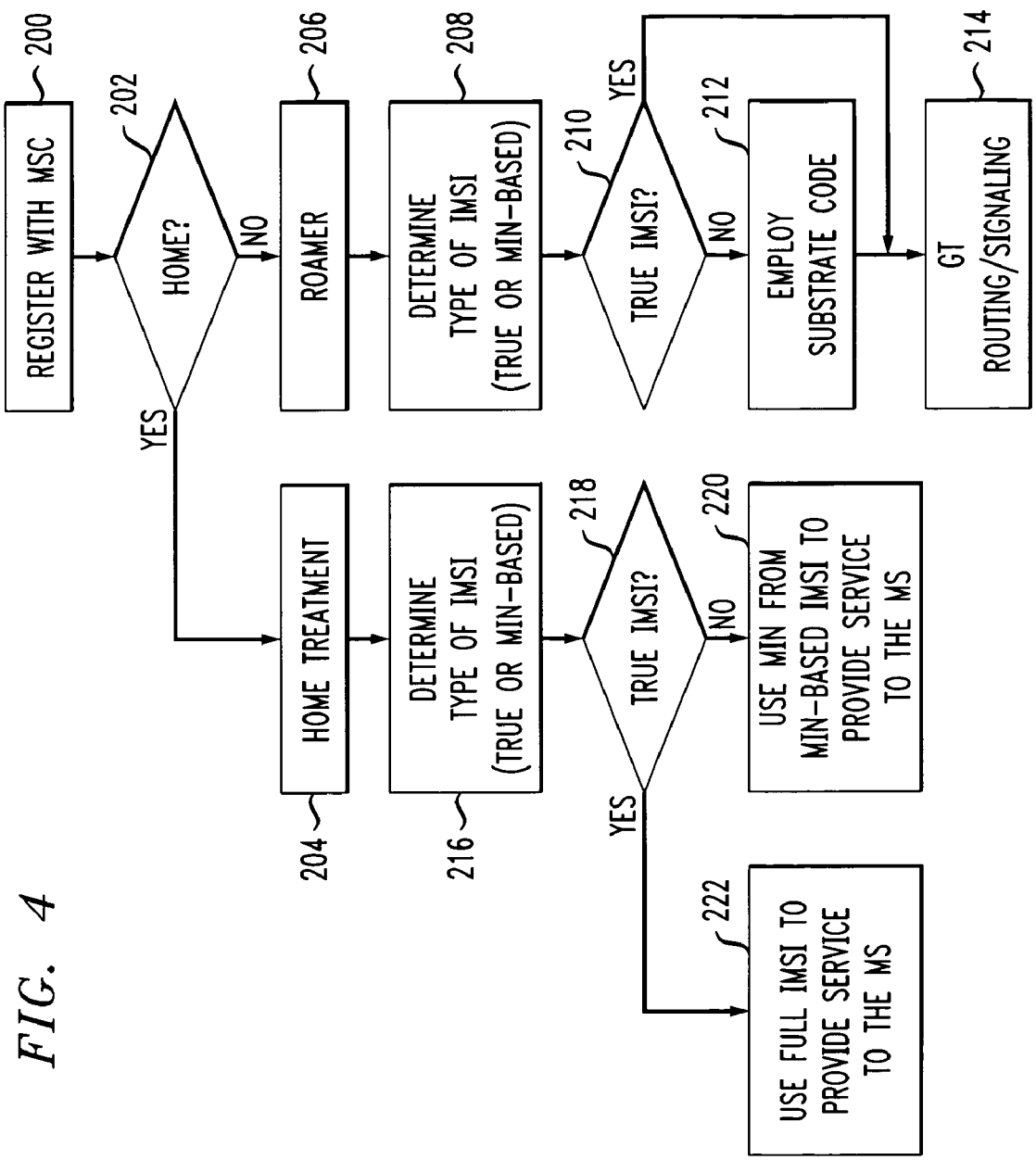
FIG. 4 is a flow chart showing an exemplary method of providing service to MS in accordance with aspects of the present invention.

With reference to FIG. 4, the wireless network A is now operative to process MIN-based and true IMSIs in providing service to MS 20 having either type of identifier, e.g., to support ANSI-41 message routing, SS7 signalling, etc. At step 200, a process begins for registering the MS 20 with the wireless network A, e.g., via the MSC 40, by send in the MS's IMSI. At decision step 202, it is determined if the registering MS is within its home network or is roaming, e.g., via a query or check of the HLR 42. If home, then the process branches to step 204 where the MS is handled in accordance with the home network treatment that begins at step 216. Otherwise, if it is determined that the MS 20 is roaming, then the process branches to step 206 where the MS is designated or deemed a roamer.

At step 208, it is determined if the IMSI received by the MSC 40 from the MS 20, e.g., during registration, is a MIN-based or true IMSI. This determination is made by comparing the most significant digits, e.g., the upper 5 digits, of the received IMSI with the list compiled in the study mode and stored in the database 46. If there is a match, the received IMSI is treated as a MIN-based IMSI, otherwise, if there is not a match, the received IMSI is treated as a true IMSI.

At decision step 210, if the received IMSI is a true IMSI, then the process branches ahead to step 214, otherwise if the received IMSI is a MIN-based IMSI, the process continues on to step 212. At step 212, a substitute code is determined for the MIN-based IMSI, and the substitute code used to replaces the MIN-based IMSI's upper digits. That is to say, the substitute code is appended to the front of the MIN code contained in the MIN-based IMSI to produce a substitute MS identifier for the MS. Suitably, substitute codes are entered by the WSP into a substitute code database 48 in the MSC 40. The substitute codes entered in the substitute code database 48 suitably designate the MCC and/or MNC for the home country and/or network of the roaming MS 20. Suitably, the substitute code database 48 is indexed using the MIN from the MIN-based IMSI received from the MS 20 to find the appropriate substitute code corresponding to that MS's home country and/or network. For example, the substitute code database 48 may be built in accordance with network specific information obtained by the WSP in connection with roaming partner agreements or the like that the WSP has negotiated with other networks so that the MS having such other networks as their home are permitted to roam within the wireless network A.

Finally, at step 214, ANSI-41 message routing, SS7 signalling, etc. for providing service to the MS 20 is carried out using GTs determined from the true IMSI or substitute MS identifier as the case may be. In either case, the identifier now contains the proper MCC and/or MNC for the MS 20. Notably, as will be appreciated by those of ordinary skill in the art, the wireless network 10 is capable of providing service to roamers, including international roamers, regardless of whether the MS 20 is properly programmed with a true IMSI, is programmed with MIN-based ISMI having a specified MIN escape code, or is programmed with a MIN-based ISMI having improperly programmed upper digits.

In an alternate embodiment, optionally for simplicity, the decision step 210 may be omitted such that all IMSI's whether true or MIN-based undergo replacement of their upper digits at step 212. That is to say, the substitution codes are obtained from the substitution code database 48 by indexing the same with the received IMSI regardless of whether the received IMSI is a true or MIN-based IMSI. However, suitably the database 48 is built such that in the case of true IMSI's, their upper digits will merely be replaced with the same values.

At step 216, it is determined if the IMSI received by the MSC 40 from the MS 20, e.g., during registration, is a MIN-based or true IMSI. This determination is made by comparing the most significant digits, e.g., the upper 5 digits, of the received IMSI with the list compiled in the study mode and stored in the database 46. If there is a match, the received IMSI is treated as a MIN-based IMSI, otherwise, if there is not a match, the received IMSI is treated as a true IMSI.

At decision step 218, if the received IMSI is a true IMSI, then the process branches ahead to step 222, otherwise if the received IMSI is a MIN-based IMSI, the process continues on to step 220. At step 220, the MSC uses the MIN from the MIN-based IMSI to register the home mobile for service and to provide subsequent service, e.g., paging the MS for incoming call delivery.

If the IMSI received from the home MS is a true IMSI, then at step 222, the MSC uses the full IMSI to register the home MS for service and to provide subsequent service, e.g., paging the MS for incoming call delivery.

Note that steps 216 through 222 are also applied to provide service to roaming MS after they have successfully registered with the visited MSC.

It is to be appreciated that particular elements or components described herein may have their functionality suitably implemented via hardware, software, firmware or a combination thereof. Note also that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively mixed and matched as appropriate to achieve other alternate embodiments suited for desired applications, the other alternate embodiments thereby realizing the respective advantages of the aspects incorporated therein. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of providing service to mobile stations utilizing a wireless telecommunications network, each of said mobile stations provisioned with an identifier comprising a set of digits, each identifier being one of two types including a first type of identifier in which a subset of most significant digits of the identifier are correctly programmed so as to indicate a home country and home network for the mobile station and a second type of identifier in which the subset of most significant digits of the identifier are incorrectly programmed, said method comprising:
   (a) defining a study period;
   (b) obtaining the identifiers from mobile stations entering the wireless telecommunications network during the study period;
   (c) collecting the subsets of most significant digits from each identifier obtained during the study period;
   (d) compiling a list of digit patterns, each digit pattern in the list corresponding to one of the subsets of most significant digits collected in step (c);
   (e) after the study period has ended, receiving identifiers from mobile stations accessing the wireless telecommunications network; and,
   (f) comparing the subsets of most significant digits of the identifiers received in step (e) to the compiled list to determine which are the first type of identifier and which are the second type of identifier.

2. The method of claim 1, wherein for the first type of identifier the entire set of digits making up the identifier comprises an international mobile station identity.

3. The method of claim 2, wherein the international mobile station identity is not more than 15 digits long.

4. The method of claim 1, wherein for the second type of identifier the subset of least significant digits making up the identifier comprises a mobile identification number.

5. The method of claim 4, wherein the mobile identification number is 10 digits long.

6. The method of claim 1, wherein each subset of most significant digits collected in step (c) includes 5 or 6 of the identifier's most significant digits.

7. The method of claim 1, said method further comprising:
   (g) replacing the subsets of most significant digits for all of the identifiers received in step (e) with substitute codes that identify at least one of the home country or the home network for the respective mobile stations from which the identifiers were received.

8. The method of claim 1, said method further comprising:
   (g) replacing the subsets of most significant digits of those received identifiers determined in step (f) to be the second type with substitute codes that identify at least one of the home country or the home network for the respective mobile stations from which the identifiers were received.

9. The method of claim 8, wherein those received identifiers determined in step (f) to be the first type do not have their subsets of most significant digits replaced.

10. The system of claim 8, wherein those received identifiers determined to be the first type do not have their subsets of most significant digits replaced.

11. The method of claim 1, wherein during the study period the wireless telecommunications network does not provide service to mobile stations having identifiers of the first type.

12. A system for providing service to mobile stations utilizing a wireless telecommunications network, each of said mobile stations provisioned with an identifier comprising a set of digits, each identifier being one of two types including a first type of identifier in which a subset of most significant digits of the identifier are correctly programmed so as to indicate a home country and home network for the mobile station and a second type of identifier in which the subset of most significant digits of the identifier are incorrectly programmed, said system comprising:
   means for defining a study period;
   means for obtaining the identifiers from mobile stations entering the wireless telecommunications network during the study period;
   means for collecting the subsets of most significant digits from each identifier obtained during the study period;
   means for compiling a list of digit patterns, each digit pattern in the list corresponding to one of the subsets of most significant digits collected;
   means for receiving identifiers—from mobile stations accessing the wireless telecommunications network; and,
   means for comparing the subsets of most significant digits of the identifiers received after the study period has ended to the compiled list to determine which are the first type of identifier and which are the second type of identifier.

13. The system of claim 12, wherein for the first type of identifier the entire set of digits making up the identifier comprises an international mobile station identity.

14. The system of claim 13, wherein the international mobile station identity is not more than 15 digits long.

15. The system of claim 12, wherein for the second type of identifier the subset of least significant digits making up the identifier comprises a mobile identification number.

16. The system of claim 15, wherein the mobile identification number is 10 digits long.

17. The system of claim 12, wherein each subset of most significant digits collected includes 5 or 6 of the identifier's most significant digits.

18. The system of claim 12, said system further comprising:
    means for replacing the subsets of most significant digits for all of the identifiers received with substitute codes that identify at least one of the home country or the home network for the respective mobile stations from which the identifiers were received.

19. The system of claim 12, said system further comprising:
    means for replacing the subsets of most significant digits of those received identifiers determined to be the second type with substitute codes that identify at least one of the home country or the home network for the respective mobile stations from which the identifiers were received.

* * * * *